United States Patent

Oda et al.

Patent Number: 5,443,868
Date of Patent: Aug. 22, 1995

[54] BLOW-MOLDED MULTI-LAYER CONTAINERS HAVING EXCELLENT SURFACE LUSTER AND PROCESS FOR PRODUCING THE SAME

[75] Inventors: Yasuhiro Oda; Yoshitugu Maruhashi; Kouzaburo Sakano; Yuji Yamaguchi, all of Yokohama, Japan

[73] Assignee: Toyo Seikan Kaisha Ltd., Tokyo, Japan

[21] Appl. No.: 172,260

[22] Filed: Dec. 23, 1993

[30] Foreign Application Priority Data

Dec. 25, 1992 [JP] Japan .................... 4-344975

[51] Int. Cl.$^6$ .................. B32B 27/32; B65D 65/40
[52] U.S. Cl. ................. 428/35.7; 428/500; 215/12.1; 215/400; 220/588; 220/415; 264/500; 264/510; 264/512
[58] Field of Search .......... 428/35.7, 500; 215/1 C, 215/12.1; 264/500, 510, 512; 220/588, 415

[56] References Cited
FOREIGN PATENT DOCUMENTS
2215529 8/1990 Japan.

Primary Examiner—Charles R. Nold
Attorney, Agent, or Firm—Sughrue, Mion, Zinn, Macpeak & Seas

[57] ABSTRACT

A blow-molded multi-layer plastic container having excellent surface luster which is obtained by blow-molding, as an outer surface of the container, an olefin resin which has fluidity properties satisfying the following formulas (1) and (2), $$\log \tau \leq n \log \dot{\gamma} + 5.15 \qquad (1)$$

and $$\log \tau \geq n \log \dot{\gamma} + 4.95 \qquad (2)$$

wherein, $\tau$ is a shearing stress (dynes/cm$^2$) as measured using a capillary rheometer in accordance with a flow property testing method (JIS K 7199), $\dot{\gamma}$ is a shearing rate (sec$^{-1}$) as measured by the same method, n is a number of from 0.39 to 0.41, and $\dot{\gamma}$ lies from $9 \times 10^1$ to $1.2 \times 10^3$ sec$^{-1}$.

The blow-molded multi-layer plastic container does not develop sharkskin or flow marks. Moreover, melt-treatment of the outer surface of the blow-molded article eliminates rugged pattern that stems from the sand-blasted surfaces of the metal mold.

7 Claims, 2 Drawing Sheets

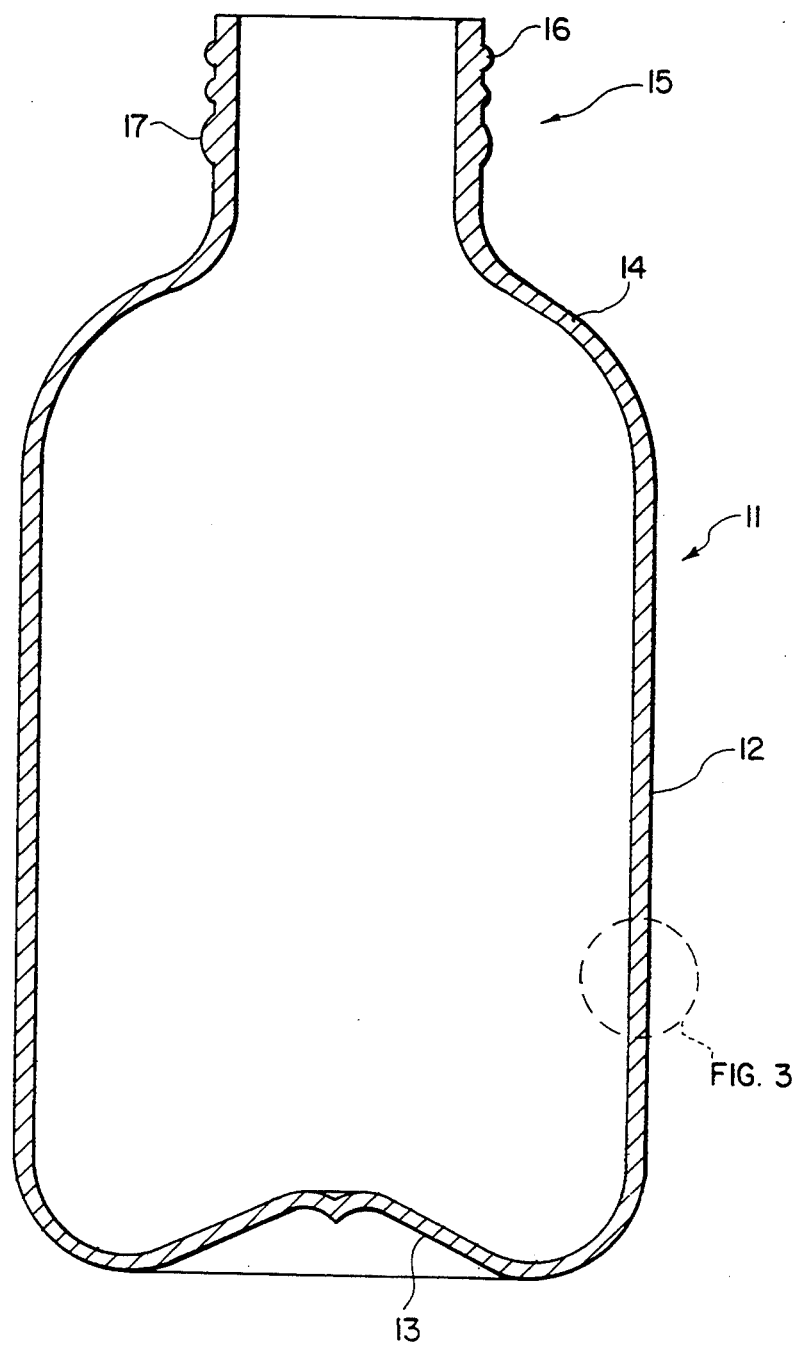

BLOW-MOLDED MULTI-LAYER CONTAINERS HAVING EXCELLENT SURFACE LUSTER AND PROCESS FOR PRODUCING THE SAME

BACKGROUND OF THE INVENTION

1. Field of the Invention

The present invention relates to blow-molded multi-layer plastic containers having excellent surface luster. More specifically, the invention relates to plastic containers of a multi-layer structure having outer surfaces of an olefin resin yet exhibiting excellent surface luster.

2. Description of the Prior Art

Plastic hollow containers obtained by blow-molding are light in weight, resistant against shocks, and have been widely used as packaging containers for a variety of foods, condiments, toiletries and the like. The containers of this type have been produced in a variety of types having a single layer and multiple layers. From the standpoint of sanitation and waterproof property, polyolefin resins such as polyethylene, polypropylene, etc. have been widely used for forming the inner and outer surfaces of the containers.

Polyolefin resins for hollow-molding are usually of a grade different from those for ordinary molding. That is, during the hollow-molding, there easily takes place phenomenon (called draw-down) in which the molten parison hangs down due to its own weight or a phenomenon (melt fracture) in which the molten parison itself undergoes undulation or exhibits sharkskined appearance. To prevent the occurrence of such defects, use has been made of a resin having a molecular weight which is relatively at high as that the melt flow rate (MFR) is 2.0 g/10 min. or smaller and that the molecular weight distribution as defined by Mw/Mn is as wide as from 3.5 to 7. This resin may be effective in preventing the draw-down but is not effective in preventing the melt fracture. When the containers are obtained by using this resin, furthermore, the container walls lack surface luster and transparency. Moreover, the products packaged in the bottles made of this resin appear to be considerably inferior to the products packaged in the glass bottles, depriving the products of commercial values.

Japanese Laid-Open Patent Publication No. 215529/1990 discloses a multi-layer plastic container of a structure having two or more resin layers that are laminated one upon the other and further having excellent surface luster, wherein the outermost surface layer is composed of an ethylene-propylene random copolymer having an ethylene content of 2 to 8% by weight, a melt flow rate of 2.5 g/10 min. or greater and an Mw/Mn ratio of 3 to 5.

In producing olefin resin bottles, so far, it is necessary to use a sand-blasted metal-mold cavity in order to prevent the resin from being melt-adhered onto the metal mold surfaces and to extract the air during the molding. In practice, however, the sand-blasted surface is transferred to the outer surfaces of the olefin resin bottles that are molded and deteriorates the luster of the outer surfaces of the bottles.

In the above-proposed blow-molded multi-layer containers, the surface luster is surely improved compared with the general olefin resin bottles but is not still satisfactory compared with other molded articles such as films and the like.

SUMMARY OF THE INVENTION

The object of the present invention therefore is to provide blow-molded multi-layer plastic containers made of an olefin resin which are free from the aforementioned defects that develop when the olefin resin is subjected to blow-molding and exhibit excellent surface luster.

According to the present invention, there is provided a blow-molded multi-layer plastic container of a structure in which two or more resin layers are laminated one upon the other and having excellent surface luster, wherein the outermost surface layer is composed of an olefin polymer which has fluidity properties satisfying the following formulas (1) and (2), $$\log \tau \leq n \log \dot{\gamma} + 5.15 \tag{1}$$

and $$\log \tau \geq n \log \dot{\gamma} + 4.95 \tag{2}$$

wherein, $\tau$ is a shearing stress (dynes/cm$^2$) as measured using a capillary rheometer in accordance with a flow property testing method (JIS K 7199), $\dot{\gamma}$ is a shearing rate (sec$^{-1}$) as measured by the same method, n is a number of frame 0.39 to 0.41, and $\dot{\gamma}$ lies from $9 \times 10^{-1}$ to $1.2 \times 10^3$ sec$^{-1}$, as measured using the capillary rheometer having a nozzle of diameter of 1 mm and a length of 10 mm at a temperature of 190° C. in accordance with said flow property testing method, and the outermost surface is melt-treated.

According to the present invention, furthermore, there is provided a process for producing multi-layer plastic containers having excellent surface luster wherein an olefin resin of the blow-molding grade is extruded as a base member and, at the same time, an olefin resin having fluidity properties satisfying the above-mentioned formulas (1) and (2) is extruded as an outer layer, an extruded parison is blow-molded in a blow mold that has sand-blasted surfaces, and the outermost surface of the blow-molded article is melt-treated.

BRIEF DESCRIPTION OF THE DRAWINGS

FIG. 2 is a side sectional view illustrating a blow-molded multi-layer plastic container according to the present invention;

DETAILED DESCRIPTION OF THE INVENTION

The blow-molded multi-layer plastic container of the present invention has a remarkable feature in that the outermost surface layer of the container is composed of an olefin resin that satisfies the above-mentioned formulas (1) and (2) and that the outermost surface is melt-treated.

As pointed out already, the blow-molded container having a surface composed of an olefin resin exhibits surface luster that is inferior to that of other molded articles such as films and the like because the sandblasted surfaces of the metal-mold cavity are transferred to the surfaces of the blow-molded article and specific patterns such as sharkskin and the like develop on the surfaces of the molded article due to melting properties of the resin.

The present inventors have discovered that among the factors that impair the surface luster of the blow-molded articles, the surface ruggedness caused by the transfer of the sand-blasted surfaces of the metal mold can be smoothed by selectively melt-treating the resin on the surface of the molded article, but rugged pattern such as sharkskin or the like formed on the surface due to the melting properties of the resin cannot be eliminated by melt-treatment.

According to the present invention, it was found that the rugged pattern such as sharkskin or flow mark due to the melt flow of the resin can be eliminated by selectively using, as the outer surface layer of the blow-molded container, an olefin resin of which the relationship between the shearing rate ($\dot{\gamma}$) and the shearing stress ($\tau$) satisfies the above-mentioned formulas (1) and (2) as measured by using a capillary rheometer in accordance with a flow property testing method (JIS K 7199), and that the rugged pattern due to the sand-blasted surfaces of the metal mold can be eliminated by melt-treating the surfaces of the blow-molded article.

The fluidity properties specified by a relationship between the shearing rate and the shearing stress contemplated by the present invention are considerably different in the meaning from the melt index (MI) and the melt flow rate (MFR) that are usually used for the olefin resins. That is, MI (the same holds for MFR too) is a property defined by the amount (in grams) extruded per a unit time (10 minutes) which does not take into consideration the relationship between the shearing rate and the shearing stress.

According to the present invention, on the other hand, the relationship between the shearing rate and the shearing stress is closely related to the occurrence of a sharkskin pattern or flow marks on the blow-molded articles.

Figure 1:
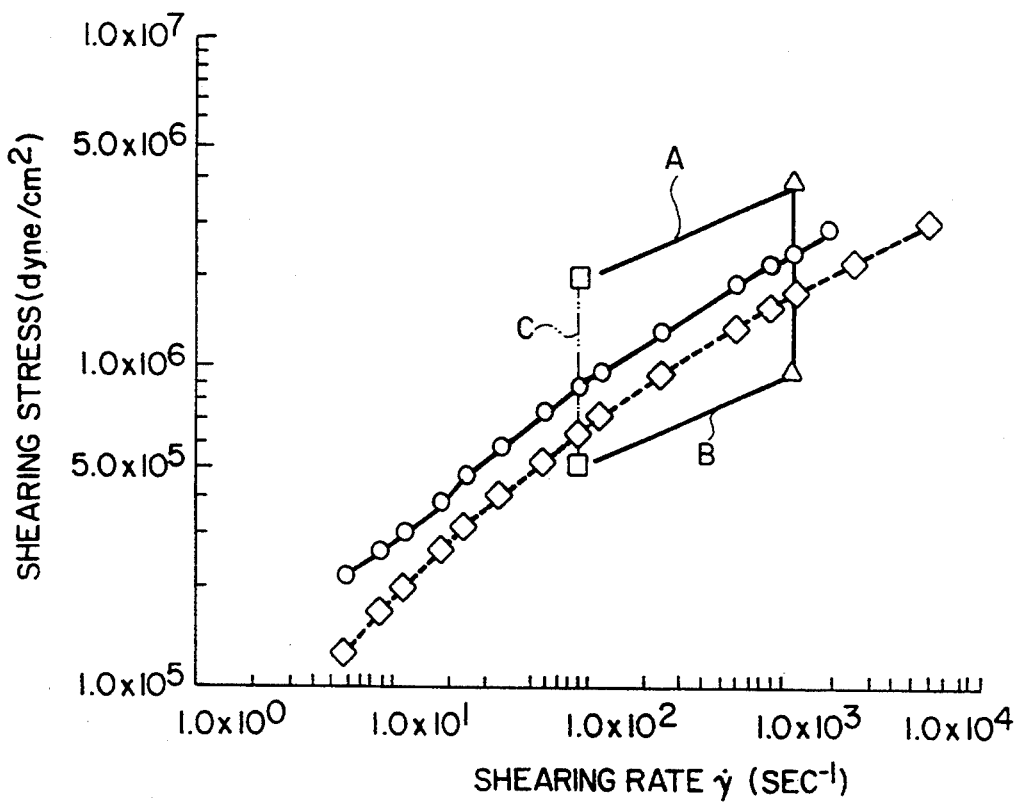
FIG. 1 is a diagram illustrating a relationship between the shearing stress ($\tau$) and the shearing rate ($\dot{\gamma}$) of a molten olefin resin.

FIG. 1 is a diagram illustrating a relationship between the shearing stress ($\tau$) and the shearing rate ($\dot{\gamma}$) as measured by using a capillary rheometer in accordance with the flow property testing method. In this diagram, a line A represents a formula, $$\log \tau = n \log \dot{\gamma} + 5.15 \quad (3)$$

where n is a number of 0.41, a line B represents a formula, $$\log \tau = n \log \dot{\gamma} + 4.95 \quad (4)$$

where n is a number of 0.39, a line C corresponds to $\dot{\gamma} = 9 \times 10^1$, Sec$^{-1}$, and a line D corresponds to $\dot{\gamma} = 1.2 \times 10^3$ sec$^{-1}$. A region surrounded by the lines A, B, C and D is the region of melt fluidity properties used by the present invention. Here, the shearing rate ($\dot{\gamma}$) has the above-mentioned range since it corresponds to the practical melt-extrusion conditions.

In a region on the upper side of the line A, i.e., in a region which does not satisfy the formula (1), sharkskin pattern develop on the outer surface of the blow-molded article, and a rugged pattern due to the sharkskin pattern remains no matter how the surface of the blow-molded article is melt-treated. Therefore, 60gloss becomes smaller than 60% which is not satisfactory in regard to surface luster.

In a region on the lower side of the line B, i.e., in a region which does not satisfy the formula (2), on the other hand, flow marks develop on the outer surface of the blow-molded article or the thickness is deviated due to the draw-down. Flow marks stand for a phenomenon in which stripes run on the surface of the melt-extruded article along the direction of extrusion due to foreign matter adhered on the die surface.

According to the present invention, an olefin resin that satisfies the above formulas (1) and (2) is blow-molded as an outer surface of the container to prevent the development of sharkskin patterns or flow marks. Moreover, the outer surface of the blow-moided article is melt-treated to eliminate any rugged pattern caused by the sand-blasted surfaces of the metal mold. Therefore, a blow-molded multi-layer plastic container is provided having excellent surface luster.

Furthermore, the present invention has an advantage in that the multi-layer plastic containers having excellent surface luster can be obtained maintaining good productivity without requiring cumbersome steps or any increase in the cost of production.

Referring to FIG. 2 which illustrates a plastic container according to the present invention, the container 11 comprises a barrel 12, a bottom 13 which is continuous to the lower end of the barrel 12 and is formed by pinching the parison off, and a neck 15 which is continuous to the upper end of the barrel 12 via a shoulder 14. The neck 15 is provided with a mouth 16 with which a closure (not shown) will intimately engage and a closure-mounting portion 17 consisting of a thread, a bead, a flange or a stepped shoulder under the mouth 16.

Figure 3:
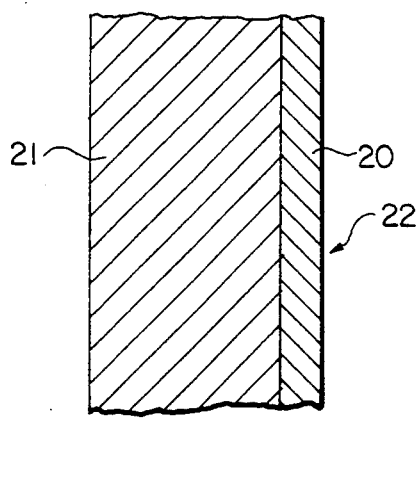
FIG. 3 is a sectional view which illustrates on an enlarged scale the sectional structure of the container wall III of FIG. 2.

This container 11 has a multi-layer structure. With reference to FIG. 3 which illustrates the sectional structure III on an enlarged scale, the container wall comprises a base layer 21 on the inner surface side of the container (left side in the drawing) and an outer surface layer 20 on the outer surface side of the container (right side in the drawing). This multi-layer structure is formed by the coextrusion of two kinds of resins. The outer surface layer 20 is composed of an olefin resin that satisfies the aforementioned formulas (1) and (2), and the outermost surface 22 thereof is melt-treated after it is blow-molded. On the other hand, the base layer 21 on the inner surface side of the container is composed of an olefin resin of the blow-molding grade which has been known per se.

When there is no adhesiveness between the base layer 21 and the outer surface layer 20, there can be interposed an adhesive resin layer though it is not shown.

Examples of the olefin resin include a polyethylene of a low, medium or high density, an isotactic polypropylene, a linear low-density polyethylene, an ethylene-propylene copolymer, a polybutene-1, an ethylene-butene-1 copolymer, a propylene-butene-1 copolymer, an ethylene-propylene-butene-1 copolymer, an ethylene-vinyl acetate copolymer, an ionically crosslinked olefin copolymer (ionomer), an ethylene-acrylic acid ester copolymer and a blend thereof. Among them, those having fluidity properties that meet the requirements of the invention should be used.

Among these olefin resins, a propylene-type resin exhibits better surface luster, lower internal haze and better transparency than those of other olefin resins, and is suited for accomplishing the object of the invention. Examples of the propylene-type resin include copolymers of a propylene in addition to a homopolypropylene and an α-olefin such as ethylene, butene-1, pentene-1 or hexene-1 and, particularly, ethylene.

The olefin resin that constitutes the surface layer has melt fluidity properties as described above. The melt fluidity properties are affected by the weight average molecular weight (Mw) and by the chemical structure of the resin. In this sense, it is desired to use an olefin resin and, particularly, a propylene-type resin having a weight average molecular weight (Mw) of from $27 \times 10^4$ to $33 \times 10^4$ and, particularly, from $29 \times 10^4$ to $32 \times 10^4$. Here, the weight average molecular weight is found by calculation in compliance with a universal calibration method by finding a molecular weight profile curve based on a gel permeation chromatography method with polystyrene as a standard. Among the propylene-type copolymers and, particularly, among the propylene-ethylene random copolymers, those having the above-mentioned weight average molecular weight are suited for accomplishing the object of the invention.

The random copolymer should contain ethylene in an amount of 2 to 8% by weight and, particularly, in an amount of 3 to 5% by weight.

Any olefin resin can be used to constitute the basic layer provided it has excellent blow moldability independently of the surface luster. In this case, the resin that constitutes the base layer forms the inner surface of the container as a matter of course. Here, however, the container is filled with a liquid content, and the external haze is almost not affected.

As the resin of the base layer, there can be used a propylene-type resin and, particularly, the homopolypropylene and the above-mentioned propylene copolymer. Propylene units should be contained in an amount of greater than 85 mol % or greater and, particularly, 90 mol % or greater with respect to the whole polymer. When a polypropylene is used, furthermore, the melt flow rate (MFR) should be 2 g/10 minutes or smaller. As another example of the polyolefin resin that constitutes the inner layer, there can be used a high-density polyethylene having an MFR of smaller than 0.5 g/10 minutes.

According to the present invention, it should be understood that it is allowed to provide a variety of functional layers as intermediate layers between the outer layer 20 and the base layer 21.

Figure 4:
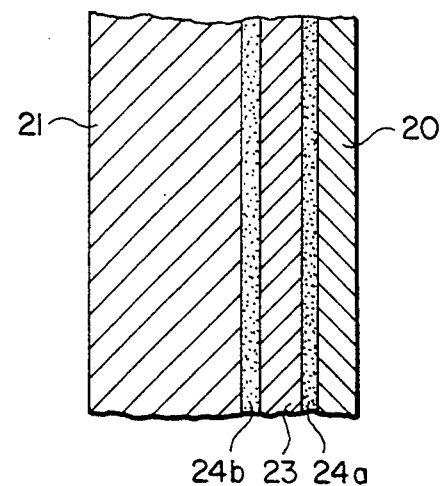
FIG. 4 is a sectional view which illustrates another sectional structure of the blow-molded multi-layer plastic container.

FIG. 4 illustrates the case where an intermediate layer 23 of a gas-barrier resin is provided between the outer layer 20 and the base layer 21 via adhesive resin layers 24a and 24b.

That is, a gas-barrier resin may be incorporated in the multi-layer structure in order that the container that is formed will have resistance against permeation of gases such as oxygen and the like. As the gas-barrier resin, there can be preferably used an ethylene-vinyl alcohol copolymer usually having an oxygen permeation coefficient (PO$_2$) of $5.5 \times 10^{-12}$ cc·cm/cm$^2$·sec·cmHg or smaller and, particularly, $4.5 \times 10^{-12}$ cc·cm/cm$^2$·sec·cmHg or smaller and, particularly an ethylene-vinyl alcohol copolymer having an ethylene content of 20 to 50 mol % and the content of unsaponified vinyl ester residue of smaller than 5 mol %, and a homopolyamide or a copolyamide having amide groups in a number of 3 to 30 and, particularly, in a number of 4 to 25 per 100 carbon atoms, and a blend thereof. It is, of course, allowable to use the above-mentioned ethylene-vinyl alcohol copolymer and the polyamide in the form of a blend which may further be blended with other thermoplastic resins such as polyolefin or a resin that gives adhesiveness to the polyolefin in an amount that does not impair the property of the gas-barrier resin, for example, in an amount of not greater than 20% by weight.

It is further allowable to provide an oxygen absorbing agent-containing resin layer and a drying agent-containing resin layer to substitute for the intermediate layer or together with the intermediate layer. Moreover, a re-grind (scrap resin) produced during the blow molding may be re-used as an intermediate layer.

In the multi-layer container of the present invention, the ratio of the thickness of the outer layer to the total thickness of the container wall should range from 1 to 30% and, particularly, from 3 to 10%, and a minimum thickness of the outer layer should be 30 µm or greater. When the thickness becomes smaller than the above lower limit, the surface luster is not fully improved. When the thickness becomes greater than the above upper limit, on the other hand, the blow-moldability of the container is deteriorated giving disadvantage in cost. The total thickness of the container varies depending upon the applications and cannot be exclusively determined, but should desirably range from 200 to 1500 µm.

Process for Production

According to the present invention, a multi-layer parison is formed by coextruding an olefin resin of the blow-molding grade as the base member and an olefin resin having fluidity properties satisfying the above formulas (1) and (2) as the outer layer. When an intermediate layer and adhesive resin layers are interposed between the base member and the outer layer, these resins are extruded at the same time as a matter of course. To carry out the coextrusion, the extruders are used in a number that corresponds to the kinds of the resins. A plurality of molten resin streams are allowed to encounter in a multi-layer multiplex die and are extruded out of the die. Use is made of a circular die and the extrusion is carried out at a temperature higher than the highest melting point among those of the resins that are used but lower than the decomposition temperature thereof. In the case of a propylene-type resin, the extrusion is carried out usually at 180° to 230° C.

When the extrusion temperature is too high, the parison tends to be drawn down remarkably. When the extrusion temperature is too low, on the other hand, sharkskin tends to develop due to melt fracture. According to the present invention, however, none of the draw-down, flow mark and sharkskin are allowed to develop at an ordinarily employed extrusion temperature.

Generally speaking, the shearing rate of the die during the extrusion should be from $5 \times 10^1$ to $1 \times 10^4$ sec$^{-1}$ and, particularly, from $1 \times 10^2$ to $1 \times 10^3$ sec$^{-1}$.

The extruded parison which is still in the molten state is blow-molded in a blow mold having sand-blasted surfaces. The blow-molding is generally effected by using a pair of split molds having parting surfaces, pinching the parison off using the split molds, and pouring the pressurized fluid into the parison that is confined therein.

Cavity surfaces of the blow mold are blasted with sand in order to prevent the molded resin from sticking onto the cavity surfaces of the mold and to effectively extract the air between the surfaces of the mold and the surfaces of the resin. From this point of view, therefore, the glass beads used for the sand-blasting should have grain sizes of from 30 to 500 μm and, particularly, from 75 to 200 μm.

The pressurized air is usually used as the pressurized fluid for the blow-molding. As desired; however, there can be used an inert gas such as nitrogen or the like, as well as water vapor and any other fluid being compressed under a pressure of 4 to 10 kg/cm² (gauge). The blow mold may be forcibly cooled with cooling water or the like.

Though there is no particular limitation, it is desired to carry out the blow-molding by using a rotary molding machine from the standpoint of efficiency. In this rotary molding machine, a number of split molds are arranged along the circumference, the split molds being allowed to rotate in a predetermined direction and further being allowed to be opened or closed. The thermoplastic resin parison is extruded from the die head in a tangential direction relative to the locus of the center of the split molds. The split molds are open at the tangential position, and the blow-molding is carried out while the parison that is fed is being held by the split molds. After the blow-molding, the split molds are opened and the molded article is discharged.

According to the present invention, the outer surface of the thus blow-molded article is melt-treated. The surface is melt-treated in order to eliminate rugged pattern that stems from the sand-blasted surfaces of the mold, but needs be treated to a small degree.

The melt-treatment can be effected by using any source of heat such as heating by flame, heating by infrared rays or induction heating. However, the treatment with flame is most desirable from the standpoint of simplicity in operation and efficiency of heating within short periods of time.

It is important that the treatment with flame is carried out under the condition of a perfect reducing flame from the standpoint of inhibiting the molten parison from burning or inhibiting the oxidation. As a fuel, there can be used any fuel gas such as city gas, propane gas, liquefied natural gas or liquefied petroleum gas. According to the present invention, satisfactory results are obtained when the heating is effected by setting the burner temperature to be, usually, from 1200° to 1400° C. and selecting the distance to be about 20 to 40 mm between the tip of the burner and the surface of the container.

EXAMPLES

EXAMPLE 1

A two-layer molten parison was formed at a resin temperature of 190° C. by feeding, to an outer layer extruder, an ethylene-propylene random copolymer that serves as an outer layer having an ethylene content of 4% and a weight average molecular weight of $30 \times 10^4$ and further having fluidity properties represented by $\log \tau = 0.39 \times \log \dot{\gamma} + 5.04$ over a shearing rate range of from $9 \times 10^1$ to $1.2 \times 10^3$ (sec$^{-1}$) as measured by using a capillary rheometer having a nozzle of a diameter of 1 mm and a length of 10 mm at a temperature of 190° C. in compliance with a flow property testing method, and further feeding an ethylene-propylene block copolymer having an MI of 1.5 as an inner layer to an inner layer extruder. The molten parison exhibited a smooth surface without developing sharkskin or flow marks. The parison was blow-molded in a blow mold of which the inner surfaces have been blasted with glass beads of grain sizes of 75 μm to 180 μm to prevent air trapping, in order to obtain a two-layer bottle having an average thickness of 800 μm, a content of 500 cc and an outer layer thickness of 50 μm as shown in FIG. 2. Since ruggedness on the inner surfaces of the metal mold had been transferred onto the surfaces of the molded bottle, the 60° luster degree was 42% as measured by using a glossmeter manufactured by Nippon Denshoku Kogyo Co.

The bottle was melt-treated by using a gas burner at a burner temperature of 1300° C., maintaining a distance of 30 mm between the burner and the bottle for a period of two seconds. As a result, ruggedness inherent in the inner surfaces of the metal mold disappeared, and the 60° luster degree was 88% which was a striking increase in the surface luster degree.

EXAMPLE 2

A bottle was molded in the same manner as in Example 1. The 60° luster degree on the surface of the bottle after molded was 42%.

The surface of the bottle was melt-treated by holding the bottle in an electric oven heated at 150° C. for 60 seconds. As a result, the 60° luster degree was 82% which was a striking increase in the surface luster degree.

EXAMPLE 3

A bottle was molded in the same manner as in Example 1. The 60° luster degree on the surface of the bottle after molded was 42%.

The surface of the bottle was melt-treated by heating the bottle surface at 190° C. for 5 seconds using an infrared-ray heating device. As a result, the 60° luster degree was 83% which was a striking increase in the surface luster degree.

COMPARATIVE EXAMPLE 1

A two-layer molten parison was formed at a resin temperature of 190° C. by feeding, to an outer layer extruder, an ethylene-propylene random copolymer that serves as an outer layer having an ethylene content of 3.5% and a weight average molecular weight of $36 \times 10^4$ and further having fluidity properties represented by $\log \tau = 0.33 \times \log \dot{\gamma} + 5.50$ over a shearing rate range of from $9 \times 10^1$ to $1.2 \times 10^3$ (sec$^{-1}$) as measured by using a capillary rheometer having a nozzle of a diameter of 1 mm and a length of 10 mm at a temperature of 190° C. in compliance with a flow property testing method, and further feeding an ethylene-propylene block copolymer having an MI of 1.5 as an inner layer to an inner layer extruder. The molten parison exhibited a sharkskined surface. This parison was blow-molded in the blow mold that was used in Example 1 to obtain a two-layer bottle. The 60° luster degree on the surface of the molded bottle was 20%.

The bottle surface was melt-treated by using a gas burner at a burner temperature of 1300° C., maintaining a distance of 30 mm between the burner and the bottle for a period of two seconds. As a result, ruggedness inherent in the inner surfaces of the metal mold disappeared but sharkskin remained clearly. Therefore, the 60° luster degree was 36% which was a low surface luster degree, and the bottle exhibited poor appearance.

COMPARATIVE EXAMPLE 2

A two-layer molten parison was formed at a resin temperature of 190° C. by feeding, to an outer layer extruder, an ethylene-propylene random copolymer that serves as an outer layer having an ethylene content of 4% and a weight average molecular weight of $25 \times 10^4$ and further having fluidity properties represented by $\log \tau = 0.41 \times \log \dot{\gamma} + 4.85$ over a shearing rate range of from $9 \times 10^1$ to $1.2 \times 10^3$ (sec$^{-1}$) as measured by using a capillary rheometer having a nozzle of a diameter of 1 mm and a length of 10 mm at a temperature of 190° C. in compliance with a flow property testing method, and further feeding an ethylene-propylene block copolymer having an MI of 1.5 as an inner layer to an inner layer extruder. The molten parison exhibited several streaks (flow marks) on the surface thereof in a direction in which the parison was extruded. This parison was blow-molded in the blow mold that was used in Example 1 to obtain a two-layer bottle. The 60° luster degree on the surface of the molded bottle was 33%.

The bottle surface was melt-treated by using a gas burner at a burner temperature of 1300° C., maintaining a distance of 30 mm between the burner and the bottle for a period of two seconds. However, the flow marks did not disappear and the bottle exhibited poor appearance.

We claim:

1. A blow-molded multi-layer plastic container of a structure in which two or more resin layers are laminated one upon the other and having excellent surface luster, wherein the outermost surface layer is composed of an olefin polymer which has fluidity properties satisfying the following formulas (1) and (2), $$\log \tau \leq n \log \dot{\gamma} + 5.15 \tag{1}$$

and $$\log \tau \geq n \log \dot{\gamma} + 4.95 \tag{2}$$

wherein, $\tau$ is a shearing stress (dynes/cm$^2$) as measured using a capillary rheometer in accordance with JIS K 7199, a flow property testing method, $\dot{\gamma}$ is a shearing rate (sec$^{-1}$) as measured by the same method, n is a number of from 0.39 to 0.41, and $\dot{\gamma}$ lies from $9 \times 10^1$ to $1.2 \times 10^3$ sec$^{-1}$, as measured by the capillary rheometer having a nozzle of a diameter of 1 mm and a length of 10 mm at a temperature of 190° C. in accordance with said flow property testing method, and the outermost surface of the container is melt-treated.

2. The blow-molded multi-layer plastic container according to claim 1, wherein the olefin polymer is an ethylene-propylene random copolymer.

3. The blow-molded multi-layer plastic container according to claim 2, wherein the ethylene-propylene random copolymer has a weight average molecular weight of from $27 \times 10^4$ to $33 \times 10^4$.

4. The blow-molded multi-layer plastic container according to claim 2, wherein the ethylene-propylene random copolymer contains ethylene in an amount of from 2 to 8% by weight.

5. The blow-molded multi-layer plastic container according to claim 1, wherein the resin other than the resin of the outer surface layer is composed of an olefin resin of a blow-molding grade.

6. A process for producing multi-layer plastic containers having excellent surface luster comprising coextruding an olefin resin of a blow-molding grade as a base material and, as an outer layer, an olefin resin which has fluidity properties satisfying the following formulas (1) and (2), $$\log \tau \leq n \log \dot{\gamma} + 5.15 \tag{1}$$

and $$\log \tau \geq n \log \dot{\gamma} + 4.95 \tag{2}$$

wherein, $\tau$ is a shearing stress (dynes/cm$^2$) as measured using a capillary rheometer in accordance with JIS K 7199, a flow property testing method, $\dot{\gamma}$ is a shearing rate (sec$^{-1}$) as measured by the same method, n is a number of from 0.39 to 0.41, and $\dot{\gamma}$ lies from $9 \times 10^1$ to $1.2 \times 10^3$ sec$^{-1}$, as measured using the capillary rheometer having a nozzle of a diameter of 1 mm and a length of 10 mm at a temperature of 190° C. in accordance with said flow property testing method, blow-molding an extruded parison in a blow mold that has sand-blasted surfaces, and melt-treating the outermost surface of a blow-molded article.

7. The process according to claim 6, wherein the outermost surface of the blow-molded article is melted by a melt-treatment comprising a flame.

* * * * *